United States Patent [19]
Close

[11] Patent Number: 5,402,904
[45] Date of Patent: Apr. 4, 1995

[54] REUSABLE BEVERAGE CAN COVER OR LID

[76] Inventor: William T. Close, 16745 Hillsdale Dr., Brookfield, Wis. 53005

[21] Appl. No.: 132,436

[22] Filed: Oct. 6, 1993

Related U.S. Application Data

[63] Continuation of Ser. No. 854,767, Mar. 20, 1992, abandoned, which is a continuation of Ser. No. 638,291, Jan. 7, 1991, abandoned.

[51] Int. Cl.[6] .............................................. B65D 51/18
[52] U.S. Cl. .................................... 220/254; 220/306; 220/335; 220/713; 220/717; 220/730
[58] Field of Search ............... 220/254, 703, 704, 711, 220/713, 716, 717, 718, 730, 306, 335, 338

[56] References Cited

U.S. PATENT DOCUMENTS

| | | | |
|---|---|---|---|
| 1,161,730 | 11/1915 | Reynolds | 220/717 |
| 2,459,558 | 1/1949 | Villegas De Oribe | 220/716 |
| 4,240,568 | 12/1980 | Pool | 220/698 X |
| 4,583,666 | 4/1986 | Buck | 220/697 X |
| 4,869,389 | 9/1989 | Cerrone, Jr. | 220/90.2 |
| 4,887,747 | 12/1989 | Ostrowsky et al. | 220/338 X |
| 4,938,379 | 7/1990 | Kellner | 220/90.2 X |
| 4,993,606 | 2/1991 | Bolen, Jr. et al. | 220/338 X |
| 5,054,640 | 10/1991 | Tucker | 220/254 X |

*Primary Examiner*—Allan N. Shoap
*Assistant Examiner*—Nova Stucker
*Attorney, Agent, or Firm*—Wheeler & Kromholz

[57] ABSTRACT

A reuseable lid for beverage cans which includes a cammed hinged flip lid (which is capable of being locked in place in an open or closed position) drip prevention lip protection shield, a release lever for greater mechanical advantage for removing the lid, and an integral grating which prevents insects and debris from entering the beverage can.

7 Claims, 2 Drawing Sheets

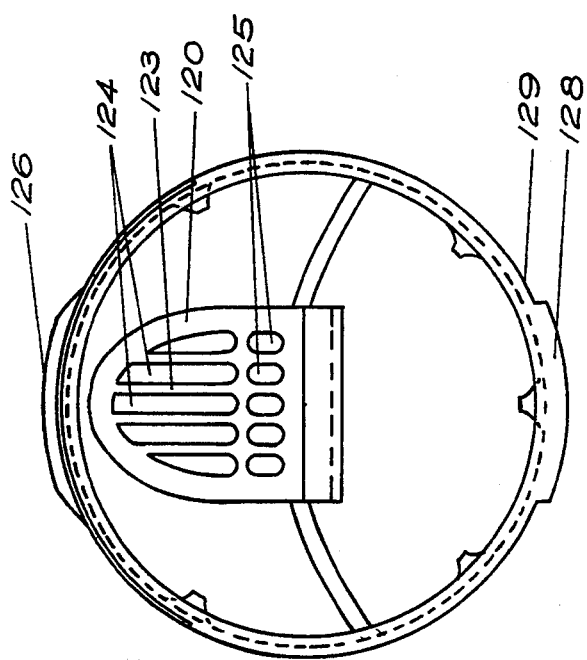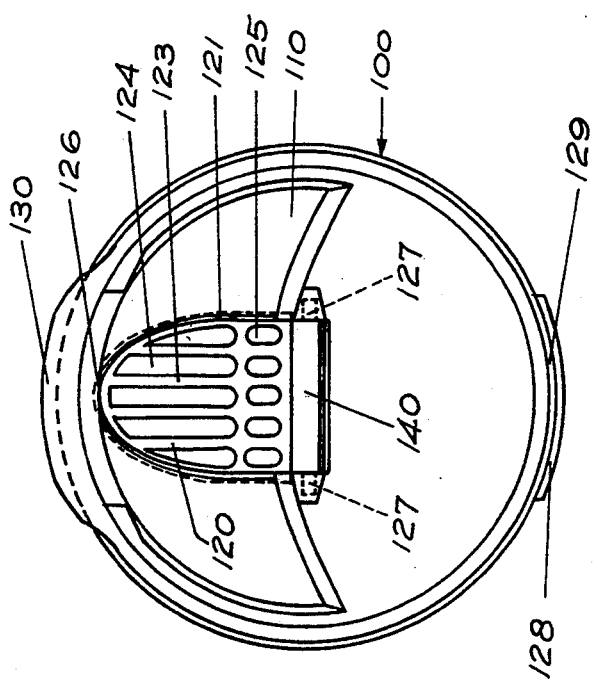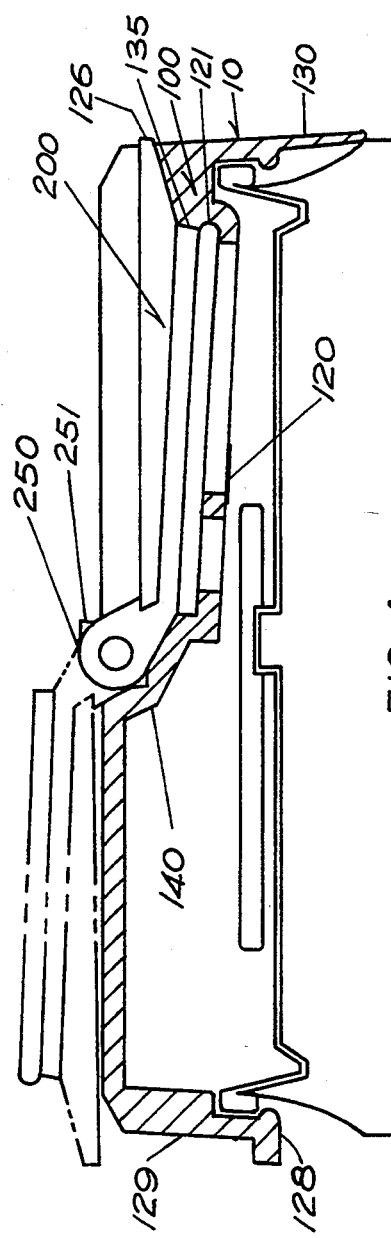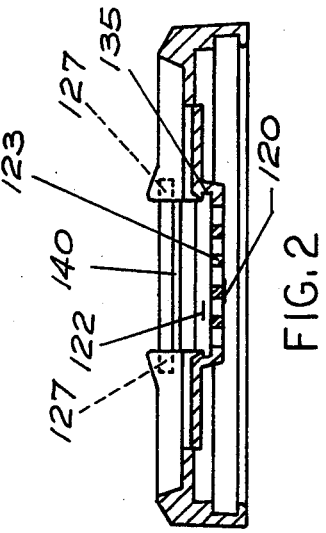

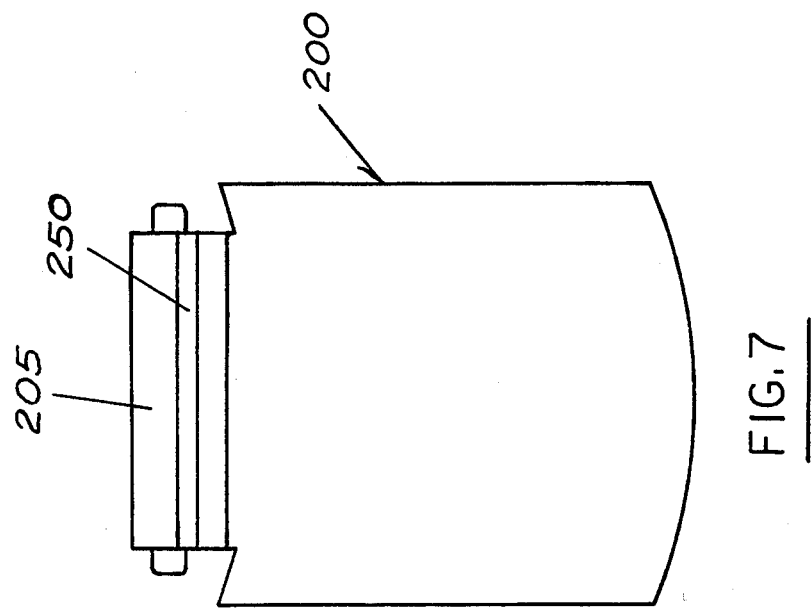
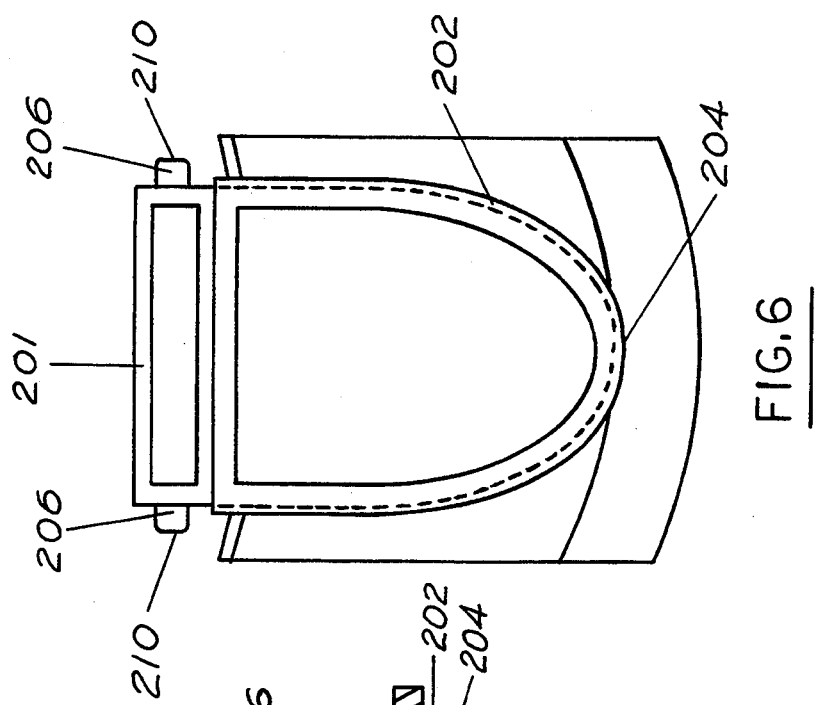
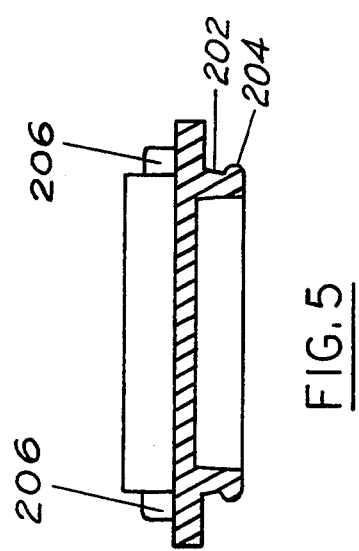

REUSABLE BEVERAGE CAN COVER OR LID

This application is a continuation, of application Ser. No. 07/854,767, filed on Mar. 20, 1992, abandoned which is a continuation of Ser. No. 07/638,291, filed on Jan. 7, 1991, abandoned.

BACKGROUND OF THE INVENTION

The present invention relates generally to the field of can lids and specifically to lids for use on aluminum or metal beverage cans.

The applicant knows of no prior art which teaches the unique structure of his invention. U.S. Pat. No. 2,753,051 discloses a hinge on a pintle for sealing a container. Otherwise none of the structure of the present invention is shown. U.S. Pat. No. 3,372,832 (Yeater) discloses a removable cover for containers. Essentially it is a plastic cover having a pop down lid which locks into place by the force of the user pushing on the cap so that the projections 23 on the bottom side of the cap are pushed past the constricted middle section 16. The structure of the present invention is not disclosed. U.S. Pat. No. 4,331,255 (Fournier) discloses a two-part lid hinge. The two sections of this lid are connected by a hinge 16 which just may be a piece of plastic. The two sections are oriented so that the second section can be hooked over and on to the first so that the peripheral channel of the second section engages over the peripheral channel of the first section to provide a shallow space between the two sections bounded by a peripheral seal. Small openings are provided in a first section leaving a relatively large continuous imperforate area in that section. A removal tab is provided for forming a drinking opening in the second section, the tab being positioned so that it is disposed opposite the imperforate area in the first section. Again the structure of the present invention is not specifically disclosed. U.S. Pat. No. 3,977,559 (Lombardi) discloses a lid for a food container. It is a plastic cover that snaps over the top of a food container having a section of that lid that has been cut out so that it may be folded back along a hinge 22. The hinge does not have or disclose the present invention's structure nor does the cap itself disclose the structure of the present invention. U.S. Pat. No. 3,994,411 (Elfelt) discloses a lid for drink cups that includes a drinking flap of limited circumferential extent that may be selectively pivotally opened and closed. Such a drinking flap may be initially defined by frangible, i.e. breakable, lateral edges in the lid and may be held in its open position by the pull tab on the flap being inserted in a slit for a straw orifice. Essentially all this patent discloses, that is pertinent to the structure of the present invention, is a cap with hinges. The Elfelt structure does not appear to be re-usable. U.S. Pat. No. 4,284,200 (Bush) discloses a child resistant dispensing closure. Again, the structure of this invention is much different from the structure of the present invention and all that is really pertinent with this reference is the fact that there is a cap with a hinge. U.S. Pat. 4,361,250 (Foster) discloses a plastic container closure. This cap may be re-usable and has a flap or portion of the cover that flips open, similar in function to the present invention, in that the flap of Foster seals well. However, the structure of Foster is different from the structure of present invention. The hinged flap of Foster has hinge strips with depending pins formed along the sides of the flap that are integrally connected with the flap by tearable webs. After the flap has first been closed, the pins are anchored to the top of the closure and prevent the flap from opening during shipment of the container. Initial opening of the flap is effected by swinging the flap upwardly with a substantial force to tear the webs and separate the webs from the strips and the anchor pins. The torn webs provide visual indication that the flap has been opened. Accordingly, this is apparently a one use device or cap since once the webs have been torn the re-useability of the device is questionable. It is designed to be tamper resistant and tamper evident packaging. The structure of the present invention is not disclosed. U.S. Pat. 4,494,679 (Cleevely) discloses a thermoplastic container closure for dispensing solids. Again, this is another structure showing a hinged flap or flip cap. However, this flip cap does not appear to have a pintle hinge-type structure. U.S. Pat. No. 4,537,326 (Morehead) merely discloses a protector for a drink can opening. Specifically it is a device designed to attach to the portion of the lid where the pop tab or the pull tab is located so that it can be swung over or incorporated into the structure of the pop can lid in order to have a grating in place over the drinking opening and prevent the ability of insects like bees to enter into the container. Other than the slits the structure is completely different from the present invention. U.S. Pat. No. 4,582,214 (Dart) discloses a non-spill drink through lid. Slits to drink through are disclosed. No other structure of present invention is disclosed. U.S. Pat. No. 4,619,372 (McFarland) discloses a cap for a hot beverage cup. The cap is a disposable, removable closure cap for beverage containers and includes a depression permitting the beverage to be drunk while the cap remains in place on the container. The cap includes perforations in a depending wall located closely adjacent an inner wall of the container in order to limit the flow of beverage into the depression defined in the upper surface of the cap. A slit in the cap permits the aroma of the beverage to be enjoyed while the beverage is being drunk from the depression. The cap may be formed from sheet plastic material. This structure is completely different from the structure of the present invention, although it does disclose slits. It does not disclose the lip protection feature of the present structure although the well 28 of the McFarland device is designed to produce a somewhat similar effect. However the structure is completely different. U.S. Pat. No. 4,629,088 (Durgin) discloses a beverage container lid which includes a foldable flap which may be opened to allow the user to drink from a beverage container which is covered by the lid. A recess in the beverage lid is provided to receive the opened flap and to firmly secure the flap in its open position. The recess includes a pair of detentes on either side and an overhang at one end which cooperate to hold the flap firmly within the recess. The flap of course is also hinged. The structure of this cap is different than the structure of the cap which is the present invention, although it appears that recess 40 allows the flap to be flipped back and locked in place so that it is out of the way when a person drinks from the container. U.S. Pat. No. 4,949,865 (Turner) discloses a container lid with an integral stop. Essentially the structure of Turner is quite different from the present invention's structure and the main similarity is the fact that it discloses a hinged flap on the lid. The hinge is molded unitarily to the upper margin of the central support in the cover. Finally, U.S. Pat. No. 4,796,774 (Nabinger) also discloses a removable and re-sealable lid for a container but Nabinger's structure is much different from the present invention's structure.

SUMMARY OF THE INVENTION

The present invention is a lid for covering a drinker's beverage can, the lid comprising: a lid section, a flip lid section, and hinge means for pivotally connecting the lid section to the flip lid section. The lid section includes a depression having an opening for allowing liquids to pass from the can through the lid and an inner side wall, a drip lip designed to prevent drips from running down the side of the lid, a lip shield means for preventing and protecting the lips of the drinker from making contact with the beverage can. The inner sidewall having a channel. The flip lid section includes a flip lid, a clasp end, frictionally engageable with a portion of said lid section, for holding the flip lid up and away from said opening while liquid is passing from the can through the lid, and an outer lip. The rim having an outer lip that is engageable with the channel of the inner side wall of the depression. Whereby when the flip lid section is flipped down, the rim locks in place, in the channel, and prevents the escape of any of the liquid from the can.

Alternatively, the invention may be summarized as an improved cover for covering a drinker's beverage can having a lid section including a drinking opening, a front drinking opening side, a hinge connection area, and a rear lever side, and a flip lid section having a hinge end, the flip lid section for covering the drinking opening, the improvement comprising: a cammed hinge means for pivotally connecting the lid section to the flip lid section, drip prevention means for preventing liquid from dripping down the side of the can after each use, lip protection means for protecting the lips of the drinker from contact with the sides of the beverage can, and release lever means for aiding in the removal of the lid section from the beverage can; said cammed hinge means being located on the hinge end of the flip lid section; said drip prevention means being located on the front drinking side of the lid section; said lip protection means being located below said drip prevention means; said release lever being located on said rear lever side of said lid section.

The lid in addition to its unique structure provides a simple and efficient way to maintain the freshness and carbonation of the beverage contained within the can.

DESCRIPTION OF THE DRAWINGS

FIG. 1 shows a top plan view of the lid section of the lid.

FIG. 2 shows a side cross-sectional view of the lid section.

FIG. 3 shows a bottom plan view of the lid section.

FIG. 4 is a cut away side view showing a portion of the lid attached to the top edge of a beverage can.

FIG. 5 is a rear cross sectional side view of the flip lid section.

FIG. 6 shows the bottom of the flip lid.

FIG. 7 shows the top of the flip lid.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The invention is an improved cap 10 for a beverage can. The purpose is to allow a user to cover the unused portion of his or her beverage to prevent spillage, spoilage, or the invasion of insects into the can, once the can has been opened. Also, the cap 10 allows the user to store the unused portion of his or her beverage once the can has been opened. Further, grid or grate 123 (described below), located over the opening of the can, of the cap 10 help to prevent debris and insects from entering into the can.

The cap 10 comprises two parts: a lid section 100 and flip lid or lid section 200. Referring to FIGS. 1-4, the lid section 100 comprises a half oval shaped depression section 110, a flip lid receptacle section 120 having a channel 121, a grating 123 located in the flip lid receptacle section 120 (this is positioned over the opening of the beverage can when the cap 10 is in use), the grating 123 having a set of long slits 124 and a set of short slits 125, a drip lip 126, a pair of hinge receptacles 127, a lid release lever 128 located on the rear lever side 129 of the lid section 100, a sloped section 140 located approximately in the center of the top of the lid section 100, and a lip shield 130.

Referring to FIGS. 4-7, the flip lid section 200 comprises a clasp end 201, an outer lip 204, a rim 202 located on the outer lip 204, and a hinge 205 having two prongs 206. Compressing the flexible lid section 100 enables the prongs 206 to be snapped into the hinge receptacles 127. The lid section 100 may then be released and the hinge receptacles 127 pushed over the ends 210 of the prongs 206.

Also, referring to FIGS. 5-7, the flip lid section 200 has a cammed section 250 located on the hinge 205. The cammed section 250 has a projection 25 1. The projection 25 1 of the cammed section 250 frictionally engages the sloped section 140 of the lid section 100 such that the flip lid section 200, when moved up and away from the grating 123, acts as a lever which causes the cammed section 250 to wedge the projection 251 against the sloped section 140 with sufficient force to produce frictional engagement between the projection 251 and the sloped section 140 so that the flip lid section 200 cannot fall back over the grating 123 when the can is tipped, as when a person takes a drink of a beverage from the can. This prevents the flip lid section 200 from contacting a person's nose while that person is drinking from the can. Further, the force of frictionally engagement is such that, while the weight of the flip lid section 200 is insufficient to overcome this frictional resistance, only the slight effort of a human hand or other slight additional force is required to disengage the projection 251 from the sloped section 140 and thus move the flip lid section back into place over the grating 123.

Once the flip lid section 200 is in place the clasp end 201 located on the end containing the prongs 206 on the flip lid section 200 is in position to engage the notch 129 of the lid section 100 so that when the flip lid section 200 is flipped back for the purpose of allowing a person to drink the beverage contained in the can covered by the cap 10 it is locked in place, as described above, so that the flip lid section 200 does not fall down and strike the person while they are drinking. When it is desired to have the flip lid section 200 closed, the outer lip 204 of the rim 202 is snapped into the channel 121 located on the side wall 135 of the drinking section depression 122. (see FIG. 2) Thus locking the flip lid section 200 in a closed position and preventing any liquid from pouring out or loss of carbonation.

Referring specifically to FIGS. 2 and 4 it may clearly be seen that the drinking section depression 122 is defined by the side wall 135 and the grating 123.

The long slits 124 of the grating 123 are designed to allow liquid to pass through them while the short slits 125 are designed to allow air to enter into the can as liquid is removed.

The drip lip 126 is located directly in front of the depressed smile shaped or oval section 110 and the grating 123. Section 110 is contoured for drainage through the grating 123. The drip lip 126 is designed to prevent drips of beverage from running down the side of the can. It is designed such that the lip of the person who is drinking the beverage from the can will strike it as they tip the can back and thereby wipe away any beverage remains which could potentially form a drip which would slide over the lip 126 and down the side of the can. The lip shield 130 of the lid section 100 is directly located under the drip lip 126. This section is provides comfort to the drinker so that his lips only press against the lid section 100 and not the beverage can.

Finally, the lid release lever 128 located on the side 129, that is directly opposite the drip lip 126 of the lid section 100, is provided as a lever to give mechanical advantage to a person wishing to remove the cap 10 from the can.

The above described embodiments of this invention are merely descriptive of its principles and are not to be limited. The scope of this invention instead shall be determined from the scope of the following claims, including their equivalents.

What is claimed is:

1. In combination a beverage can and a reusable cover for covering the beverage can having an outside surface and top surface including an opening, defined by a portion of the top surface, from which a human being may drink a beverage, said reusable cover comprising:

a lid section, a flip lid section, a hinge means for connecting said flip lid section to said lid section;

said lid section including a drinking depression having a flip lid receiving section, the flip lid receiving section having a sidewall which defines an opening for allowing liquids to pass out of the beverage can, through the opening in the beverage can, through the lid section;

said sidewall having a channel;

said drinking depression being defined by a sidewall and said bottom opening;

said lid section further including a drip lip means for preventing drips from running down the side of said lid section and the beverage can and a lip shield means for preventing and protecting the lips of the drinker from making contact with outside surface of the beverage can;

said flip lid section including a flip lid, a clasp end for holding said flip lid up and away from said bottom opening of said lid section, and an outer lip;

said outer lip having a rim that is engageable with said channel of said sidewall which defines the opening for allowing liquids to pass out of the beverage can;

said hinge means releasibly connecting said flip lid section to said lid section.

2. The combination of claim 1 in which the opening in the drinking depression for allowing liquids to pass out of the beverage can is covered by a grating.

3. The combination of claim 1 in which said flip lid is capable of swinging approximately 180 degrees from an open to a closed position.

4. The combination of claim 1 in which the reusable cover is made out of plastic.

5. The combination of claim 1 in which the drinking depression is contoured for drainage.

6. The combination of claim 2 in which the grating has long slits and short slits; the short slits be spacially positioned in relation to the long slits so that liquid passes through the long slits while air passes through the short slits.

7. In combination with a drinker's beverage can an improved reusable cover for covering the drinker's beverage can, the improved reusable cover having a lid section including a top surface having a drinking opening, the drinking opening being covered by grating, a front drinking opening side located below the drinking opening, a hinge connection area, and a rear lever side located opposite the drinking opening, and a flip lid section having a hinge end engaged with the hinge connection area, the flip lid section for covering the grated drinking opening, the improvement comprising:

a drip prevention means for preventing the liquid from dripping done the side of the can after each use;

a lip protection means for protecting the lips of the drinker from contact with the side of the beverage can;

a release lever means for aiding in the removal of the lid section from the beverage can;

said drip prevention means being located on the front drinking side of the lid section;

said lip protection means being located below said drip prevention means; and said release lever means being located on said rear lever side of said lid section.

* * * * *